(12) United States Patent
Solapurkar et al.

(10) Patent No.: US 11,991,291 B1
(45) Date of Patent: May 21, 2024

(54) CONTENT-BASED DOMAIN NAME ENCONDING, ENCRYPTION, AND ROUTING SYSTEM

(71) Applicant: Amazon Technologies, Inc., Seattle, WA (US)

(72) Inventors: Chaitanya Ashok Solapurkar, Issaquah, WA (US); Jorge Peixoto Vasquez, Mercer Island, WA (US); Mukul Gupta, Vancouver (CA); Jennifer Angelica Ongko, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 230 days.

(21) Appl. No.: 17/657,561

(22) Filed: Mar. 31, 2022

(51) Int. Cl.
*H04L 9/32* (2006.01)
*H04L 9/08* (2006.01)
*H04L 61/4511* (2022.01)

(52) U.S. Cl.
CPC ............ *H04L 9/3242* (2013.01); *H04L 9/083* (2013.01); *H04L 61/4511* (2022.05); *H04L 2209/34* (2013.01)

(58) Field of Classification Search
CPC .......................... H04L 9/3242; H04L 2209/42
See application file for complete search history.

(56) References Cited

U.S. PATENT DOCUMENTS

| 2009/0210526 | A1* | 8/2009 | Howell | H04L 67/56 709/224 |
| 2009/0216903 | A1* | 8/2009 | Howell | H04L 61/58 709/245 |
| 2010/0269174 | A1* | 10/2010 | Shelest | H04L 9/3236 707/E17.014 |
| 2013/0156189 | A1* | 6/2013 | Gero | H04L 9/0825 380/255 |
| 2018/0097831 | A1* | 4/2018 | Uppal | H04L 63/0428 |
| 2022/0224542 | A1* | 7/2022 | Sharma | H04L 61/4511 |

\* cited by examiner

*Primary Examiner* — Ponnoreay Pich
(74) *Attorney, Agent, or Firm* — Knobbe, Martens, Olson & Bear LLP (57) ABSTRACT

System and methods are provided for encoding and encrypting DNS labels with content metadata and client metadata. A client computing device transmits a DNS query for the encoded domain name. A DNS server receives the encoded domain name and decrypts and decodes the domain name label. The DNS server uses the decrypted and decoded client and content metadata to make a routing decision to select a particular point of presence (PoP). The DNS server sends, to the client computing device, a DNS reply with the Internet Protocol (IP) address of the selected PoP. The client computing device requests content from the PoP identified by the provided IP address.

20 Claims, 8 Drawing Sheets

CONTENT-BASED DOMAIN NAME ENCONDING, ENCRYPTION, AND ROUTING SYSTEM

BACKGROUND

A Domain Name System (DNS) query (also known as a DNS request) is a demand for information sent from a client computer to a DNS resolver. Generally, a DNS query is sent to request the Internet Protocol (IP) address associated with a domain name. Domain names consist of a series of labels separated by dots. Each label can be up to 63 bytes long. In some cases, the DNS resolver is the computing device that responds to the DNS query from a client. The DNS resolver does this by making a series of requests until it reaches the authoritative DNS server for the requested record. A content delivery network (CDN) refers to a geographically distributed group of servers that work together to provide network content. In a CDN, devices may be organized into points of presence (PoPs). The DNS servers for a CDN can cause HTTP traffic to be routed to different PoPs based on a number of factors, such as geography.

BRIEF DESCRIPTION OF THE DRAWINGS

These and other features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

As described above, a Domain Name System (DNS) can be used for routing network traffic. Such routing of network traffic can be applied in the context of a Content Delivery Network (CDN), which is responsible for providing network content to clients. For example, in response to a DNS query, a DNS server can respond with the IP address of a point of presence (PoP) selected from among several other points of presence (PoPs). A DNS server could use additional data, such as metadata regarding the client computing device or metadata regarding the requested content, to make a routing decision. In particular, the additional data could be included in a label of a domain name; however, without any encryption, the additional data included in the label would be exposed to the public.

Generally described, aspects of the present disclosure are directed to improved encoding and encrypting systems and methods that can be used for DNS routing decisions to direct to particular points of presence (PoPs). A translation library may be used to encode and encrypt (i) content metadata and (ii) client metadata as part of a domain name label. As used herein, a translation library may also be referred to as an encryption library. In some embodiments, such as in the context of a CDN, a client computing device can use the translation library to encode and encrypt a domain name. The client computing device can transmit a DNS query for the encoded domain name. A DNS server can receive the encoded domain name, and, using the translation library, can decrypt and decode at least a portion of the domain name label. The DNS server can use the decrypted and decoded data to make a routing decision to select a particular point of presence (PoP). The DNS server can send, to the client computing device, a DNS reply with the Internet Protocol (IP) address of the selected PoP. The client computing device can then request content from the PoP identified by the provided IP address.

In some embodiments, such as in the context of a CDN, a client computing device can request content from a point of presence before any routing decision has been made based on content or client metadata. In these embodiments, the client computing device may not have translation capabilities to encode a domain name. Instead, the point of presence may use a translation library to encode and encrypt a domain name, and the point of presence can respond to a request for content with a message redirecting the client computing device to the encoded domain name. As a result, the client computing device sends a DNS query for the encoded domain name, and a DNS server, using the translation library, can decrypt and decode at least a portion of the domain name label. The DNS can use the data decoded from the domain name label to make a routing decision and select a particular point of presence. As discussed above, the DNS server can send, to the client computing device, a DNS reply with the Internet Protocol (IP) address of the selected point of presence and the client computing device can then request content from the point of presence identified by the provided IP address.

As described above, some existing systems make routing decisions at the DNS. However, the existing systems may suffer one or more technical deficiencies. For example, in some cases, the IP address or the IP subnet of the client computing device is not provided to the DNS server; for example, a DNS server may receive the IP address of the DNS resolver and not the IP address or the IP subnet of the client computing device that made the DNS query. A DNS server can make a routing decision based on the IP address of the DNS resolver, such as by selecting a point of presence that is located near a geolocation associated with the IP address of the DNS resolver. However, the DNS resolver may be physically located far away from the client computing device, and, therefore, the selected point of presence may be an inefficient choice for the client computing device. As another example, in existing systems, content metadata is not available in a DNS query. Thus, it is not possible for a DNS server to make content-based routing decisions. Accordingly, existing systems can disadvantageously lack client metadata and/or content metadata for making routing decisions at the DNS.

Accordingly, the systems and methods described herein may improve networking technology. The solution described herein for encoding and encrypting client metadata and/or content metadata in a domain name label can advantageously improve network routing. For example, by having client metadata, such as a client subnet, a DNS server can advantageously select a point of presence that would efficiently provide network content based on the geolocation of the client computing device. Similarly, by having content metadata, a DNS server can advantageously select a point of presence that would efficiently provide network content based on the content to be requested. By knowing the specific content or type of content to be requested, the DNS server may select a point of presence that has a cache that is appropriate for the requested content. For example, the DNS server can select a point of presence with an appropriate cache size or can direct to a point of presence that has the resource cached already or is likely to have the resource cached already. Thus, the systems and methods described herein can improve over existing network routing techniques.

Moreover, the solutions described herein may be inextricably tied to computer networking and encryption technology. For example, as described herein, a domain name label has up to 63 bytes, which is not a lot of space for encoding and encryption. The techniques described herein can advantageously allocate enough space in the domain name label for encryption overhead and the remaining space may be used for metadata that can inform network routing decisions. Thus, the systems and methods described herein are inextricably tied to computer networking and encryption technology.

Figure 1A:
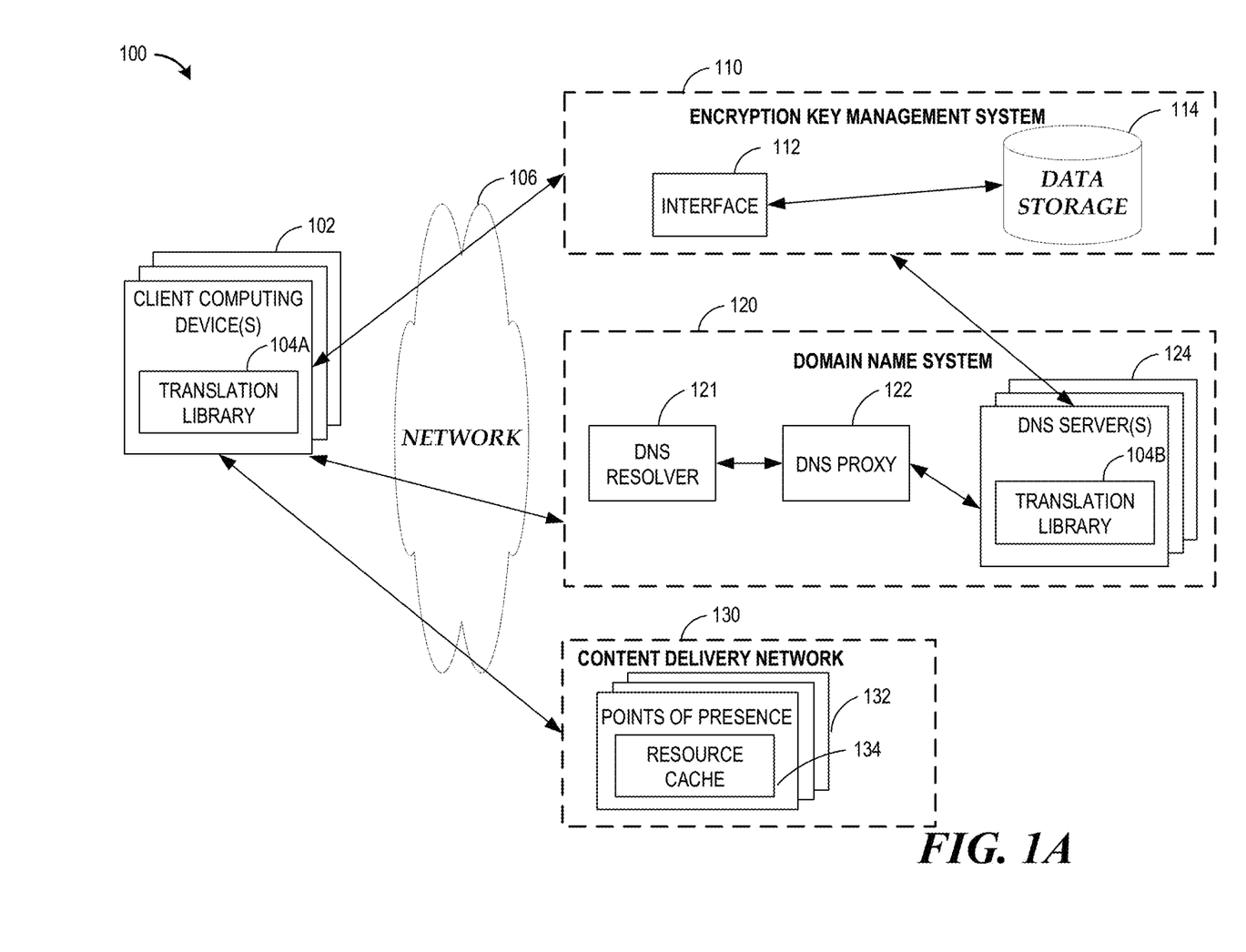
FIG. 1A is a schematic block diagram depicting an illustrative network environment with a Domain Name System, a Content Delivery Network, an encryption key management system, and a client computing device with a translation library configured to encode a domain name.

Turning to FIG. 1A, an illustrative network environment 100 is shown. The network environment 100 may include one or more client computing devices 102, an encryption key management system 110, a Domain Name System 120, and a Content Delivery Network 130. The client computing device 102 may include a translation library 104A. The encryption key management system 110 may include an interface 112 and a data storage 114. The DNS 120 may include a DNS resolver 121, a DNS proxy 122, and one or more DNS servers 124. The DNS server 124 may include a translation library 104B. The Content Delivery Network 130 includes points of presence (PoP) 132. The point of presence (PoP) 132 includes a resource cache 134. As used herein, in addition to its ordinary and customary meaning, a "point of presence (PoP)" can refer to collection of devices, such as servers, routers, and/or switches that collectively reflect a demarcation point between two or more networks. The constituents of the network environment 100 may be in communication with each other either locally or over a network 106.

Example client computing devices 102 can include a laptop or tablet computer, personal computer, personal digital assistant (PDA), hybrid PDA/mobile phone, smart wearable device (such as a smart watch), mobile phone, and/or a smartphone. A user can use an application on the client computing device 102, such as a media player application. The application on the client computing device 102 can be configured to use the translation library 104A. For example, in response to user interactions, the application can request content, which can be requested over the network 106. The application can be programmed to format content requests using the translation library 104A, such as encoding and encrypting a domain name label with client metadata and/or content metadata, as described herein. The translation library 104A can be configured to communicate with the encryption key management system 110. The client computing device 102, via the translation library 104A, can format and send a DNS query with the encoded domain name. In some embodiments, the translation library 104A is provided to the client computing device 102 by the owner or operator of the DNS 120 and/or the CDN 130. Additionally or alternatively, some client computing devices 102 may implement the translation library 104A based on a specification provided by the owner or operator of the DNS 120 and/or the CDN 130.

The DNS server 124 can receive a DNS query via the DNS proxy 122 and the DNS resolver 121. The DNS server 124 can store and/or access DNS records. Example DNS records can include, but are not limited to, CNAME or canonical name DNS records that map an alias name to a canonical domain name and/or wildcard DNS records that can match multiple subdomains. The DNS server 124 can use the translation library 104B to decrypt and decode the encoded domain name from the DNS query. The DNS server 124 can use the client metadata and/or the content metadata to make a routing decision and select a point of presence (PoP) 132 from the CDN 130. The DNS server 124 can respond to the DNS query with an IP address of the selected PoP 132. The client computing device 102 can request content from the IP address of the selected PoP 132.

The DNS proxy 122 can route DNS queries. As described herein, the DNS 120 can be a hosted computing environment and the DNS proxy 122 can be responsible for routing DNS queries to different DNS servers 124 in the hosted computing environment.

The encryption key management system 110 can communicate with the translation library 104A, 104B. For example, the translation library 104A can use a counter initialization vector to encrypt data in the domain name label. Each translation library 104A, 104B can be assigned an instance identifier. Each translation library 104A, 104B instance can have a range of counter initialization vectors assigned. If a translation library 104A, 104B is running out of counter initialization vectors, a new key can be assigned to the instance of the translation library 104A, 104B via communication with the interface 112. The assignments of counter initialization vectors to instances and the corresponding encryption keys can be stored in the data storage 114.

The data storage 114 may be embodied in hard disk drives, solid state memories, any other type of non-transitory computer-readable storage medium. The data storage 114 may also be distributed or partitioned across multiple local and/or remote storage devices. The data storage 114 may include a data store. As used herein, in addition to its ordinary and customary meaning, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, comma separated values (CSV) files, eXtendible markup language (XML) files, TeXT (TXT) files, flat files, spreadsheet files, and/or any other widely used or proprietary format for data storage.

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks, such as HTTP. Protocols and components for communicating via the Internet or any of the other aforementioned types of communication networks are well known to those skilled in the art of computer communications and thus, need not be described in more detail herein.

The client computing devices 102, the encryption management system 110, the DNS 120, and the CDN 130 may each be embodied in a plurality of devices. For example, client computing devices 102 and components of the encryption management system 110, the DNS 120, and the CDN 130 may include a network interface, memory, hardware processor, and non-transitory computer-readable medium drive, all of which may communicate with each other by way of a communication bus. The network interface may provide connectivity over the network 106 and/or other networks or computer systems. The hardware processor may communicate to and from memory containing program instructions that the hardware processor executes in order to operate the client computing devices 102 and components of the encryption management system 110, the DNS 120, and the CDN 130. The memory generally includes RAM, ROM, and/or other persistent and/or auxiliary non-transitory computer-readable storage media.

Additionally, in some embodiments, the encryption management system 110, the DNS 120, and the CDN 130 or components thereof are implemented by one or more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "serverless," "cloud," or distributed computing environment.

Figure 1B:
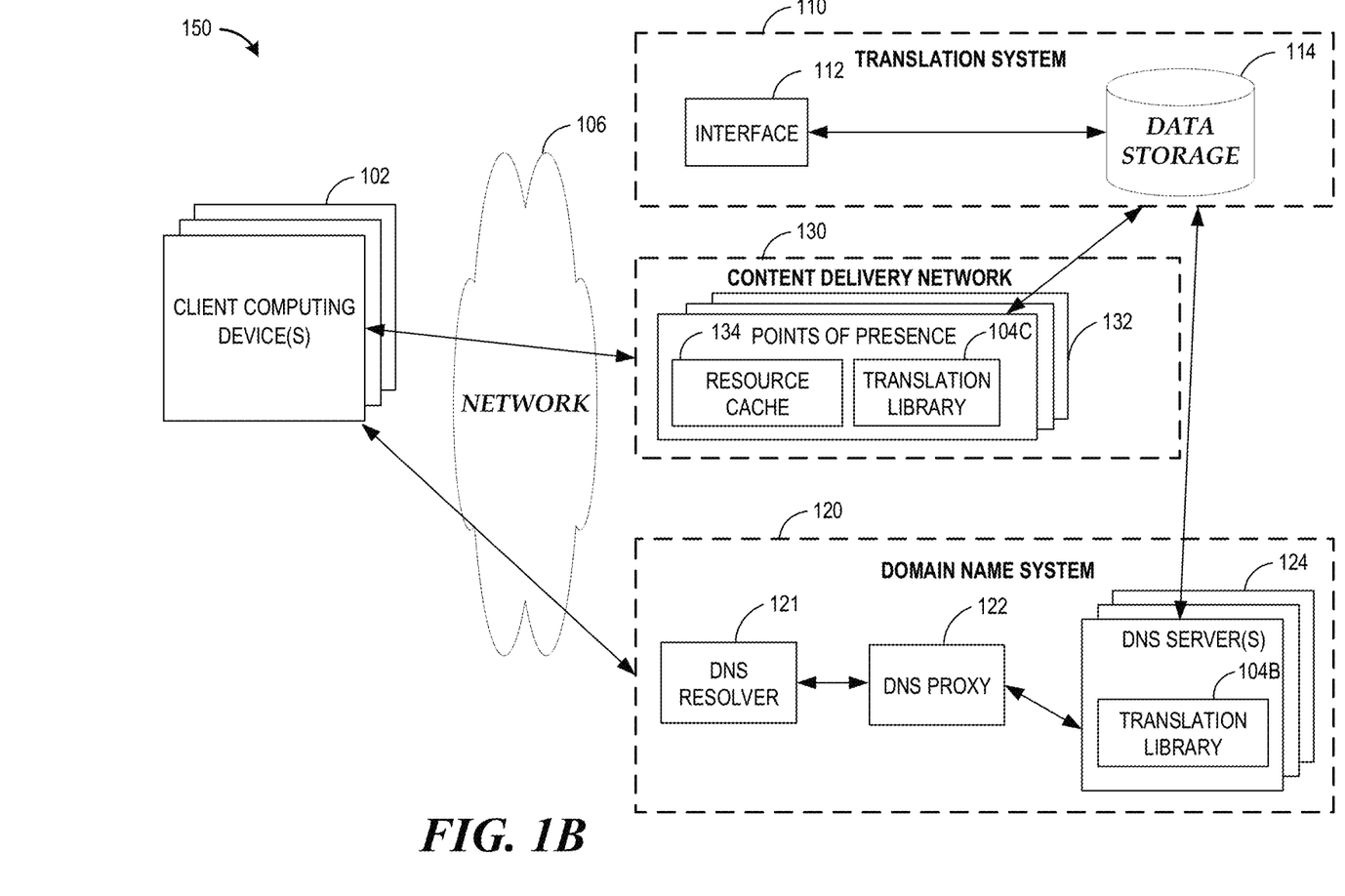
FIG. 1B is a schematic block diagram depicting another illustrative network environment with a Domain Name System, a Content Delivery Network, an encryption key management system, a client computing device, and a point of presence with a translation library configured to encode a domain name.

Turning to FIG. 1B, the network environment 150 of FIG. 1B can be similar to the network environment 100 of FIG. 1A. However, in the network environment 150 of FIG. 1B, the point of presence (PoP) 132 can include a translation library 132. In the embodiments of FIG. 1B, the PoP 132 can be configured to encode a domain name and redirect the client computing device 102 to the encoded domain name. In these embodiments, the client computing device 102 need not implement or otherwise include the translation library 104C. Accordingly, the client computing device 102 of FIG. 1B can be routed to a particular PoP in a similar manner as occurs to the client computing device 102 of FIG. 1A.

Figure 2:
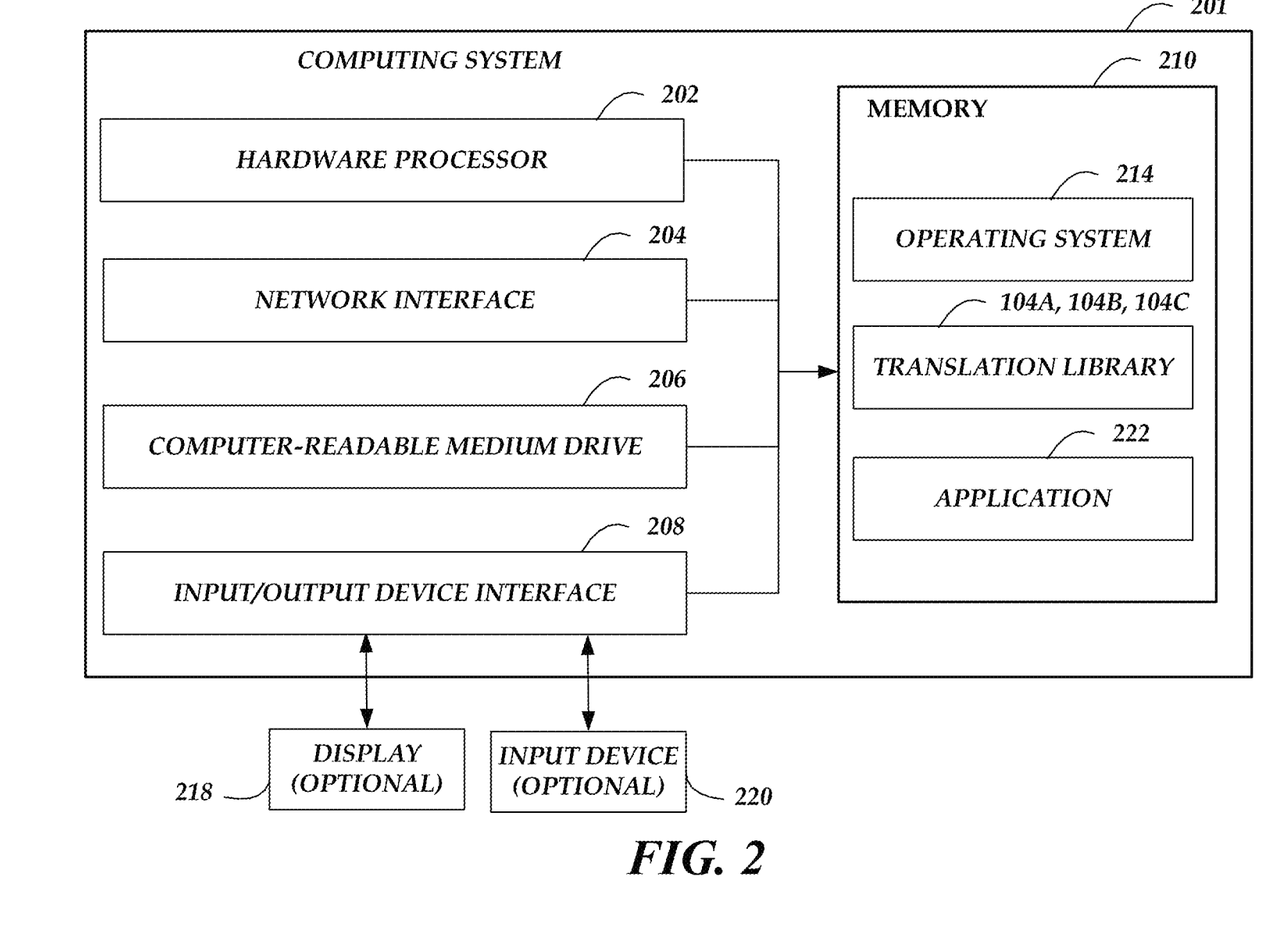
FIG. 2 is a schematic diagram depicting an illustrative general architecture of a computing system for implementing one or more devices referenced in the network environment depicted in FIGS. 1A, 1B.

FIG. 2 is a schematic diagram of an illustrative general architecture of a computing system 201 for implementing the client computing device 102 referenced in the environment 100, 150 in FIGS. 1A, 1B. The computing system 201 includes an arrangement of computer hardware and software components that may be used to execute the translation library 104A. While the general architecture of the computing system 201 is shown and described with respect to FIG. 2, the general architecture of FIG. 2 can be used to implement other devices described herein, such as the DNS server 102 and/or a device within the point of presence (PoP) 132. Those skilled in the art will appreciate that the computing system 201 may include more (or fewer) components than those shown in FIG. 2. Further, other computing systems described herein may include similar implementation arrangements of computer hardware and software components.

The computing system 201 for implementing the client computing device 102 may include a hardware processor 202, a network interface 204, a non-transitory computer-readable medium drive 206, and an input/output device interface 208, all of which may communicate with one another by way of a communication bus. As illustrated, the computing system 201 is associated with, or in communication with, an optional display 218 and an optional input device 220. In other embodiments, the display 218 and input device 220 may be included in the client computing devices 102 shown in FIG. 1A, 1B. The network interface 204 may provide the computing system 201 with connectivity to one or more networks or computing systems. The hardware processor 202 may thus receive information and instructions from other computing systems or services via the network 106. The hardware processor 202 may also communicate to and from memory 210 and further provide output information for an optional display 218 via the input/output device interface 208. The input/output device interface 208 may accept input from the optional input device 220, such as a keyboard, mouse, digital pen, touch screen, accelerometer, gyroscope, or gestures recorded via motion capture and/or image recognition (e.g., eye, hand, head, and/or body part placement and/or recognition). The input/output device interface 220 may also output audio data to speakers or headphones (not shown).

The memory 210 may contain specifically configured computer program instructions that the hardware processor 202 executes in order to implement one or more embodiments of the client computing device 102. The memory 210 generally includes RAM, ROM and/or other persistent or non-transitory computer-readable storage media. The memory 210 may store an operating system 214 that provides computer program instructions for use by the hardware processor 202 in the general administration and operation of the client computing device 102.

The memory 210 may include an application 222 and the translation library 104A, 104B, 104C that may be executed by the hardware processor 202. In some embodiments, the translation library 104A, 104B, 104C may implement various aspects of the present disclosure. For example, the translation library 104A, 104B, 104C may encrypt/encode or decrypt/decode metadata into or from a domain name label.

Figure 3A:
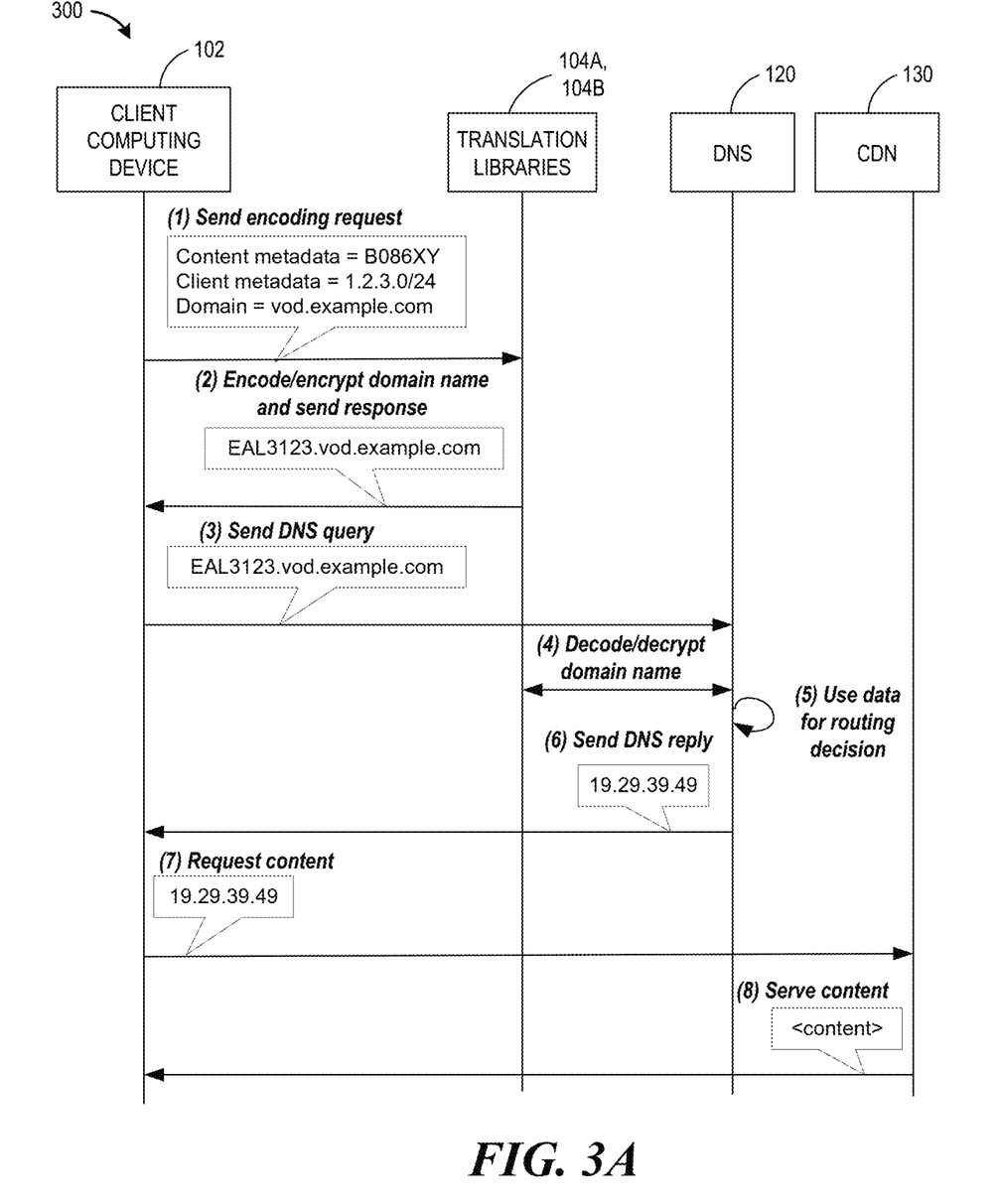
FIGS. 3A, 3B are flow diagrams depicting illustrative interactions related to encoding a domain name and using the encoded domain name to make a routing decision.

With reference to FIG. 3A, illustrative interactions related to encoding a domain name and using the encoded domain name to make a routing decision are depicted. The components of the environment 300 of FIG. 3A can be similar to the components of the environment 100 of FIG. 1A. The depicted interactions in FIG. 3A are example interactions, some or all of which may be optional depending on the circumstances or embodiment. Other interactions (not illustrated) may be possible in accordance with the present disclosure in other embodiments; not every possible communication may be depicted in FIG. 3A.

The interactions of FIG. 3A begin at step one (1) where the client computing device 102 can send an encoding request to the translation library 104A. In particular, an application on the client computing device 102, such as a video streaming application, can send the encoding request to the translation library 104, which can also be executing on the client computing device 102. As illustrated, the encoding request can include at least client metadata, content metadata, and a domain name. Example client metadata can include an IP subnet for the client computing device (here illustrated by the example text "1.2.3.0/24"). Additionally or alternatively, example client metadata can also include an IP address for the client computing device or a device type for the client computing device. An example domain name (here "vod.example.com") can be an alias name that is mapped to a canonical domain name.

Example content metadata can include a content identifier (here "B086XY"). Example content identifiers can indicate a specific resource or can be a content group. As used herein, in addition to its ordinary and customary meaning, the term "content group" can refer to a grouping of related resources (which can also be referred to as objects) served by a Content Delivery Network. A content group can depend on the use case. For example, in video on-demand streaming, a content identifier can reference specific media content such as MovieName-DASH-H.264 or ActorName-HLS-UHD-H.265. In a live streaming context, a content identifier can refer to a specific game or event, e.g., NFL or soccer game. In a live linear video streaming context, a content identifier can refer to a live streaming channel. In a video game repository context, the content metadata can include a content group that refers to a specific game title that consists of multiple packaged files. The illustrated content identifier text, "B086XY," is example text and a content identifier value can be much longer than the example text.

At step two (2), the translation library 104A can encrypt and encode the content metadata and client metadata in a domain name label. The translation library 104A can append the encoded domain name label to the domain name (here the example encoded domain name label is "EAL3123" is appended to the domain name "vod.example.com"). The illustrated encoded domain name label text, "EAL3123," is example text and an encoded domain name label can be up to 63 bytes. The translation library 104A can send a response with the encoded domain to the client computing device 102. As mentioned above, an application executing on the client computing device 102 can receive the encoded domain from the translation library 104A. Additional details regarding encrypting and encoding a portion of the domain name are described herein.

At step three (3), the client computing device 102 can send a DNS query that includes at least the encoded domain name. As described herein, the DNS 120 can receive the DNS query. In particular, the DNS resolver 121 and the DNS proxy 122 can route the DNS query to a DNS server 124.

At step four (4), the DNS 120 (and, in particular, the DNS server 124) can decode and decrypt the encoded domain name from the DNS query using the translation library 104B. The translation library 104B can extract the client metadata and the content metadata from the encoded domain name label and provide that information to the DNS server 124 of the DNS 120. Additional details regarding decrypting and decoding a portion of the domain name are described herein.

At step five (5), the DNS 120 (and, in particular, the DNS server 124) can use the client metadata and/or the content metadata to make a routing decision. For example, the DNS server 124 can select a point of presence (PoP) with an appropriate cache size or can direct to a PoP that has the resource cached already or is likely to have the resource cached already. As another example, using the client metadata, such as the client computing device's subnet, the DNS server 124 can advantageously select a PoP that would efficiently provide network content based on the geolocation of the client computing device. The DNS server 124 can determine the Internet Protocol (IP) address of the selected PoP.

At step six (6), the DNS 120 (and, in particular, the DNS server 124) can send a DNS reply to the client computing device 102 with the IP address of the selected PoP in response to the DNS query. At step seven (7), the client computing device 102 can request content from the IP address of the selected PoP. An example content request can be an HTTP GET request. Accordingly, at step eight (8), the CDN 120 (and, in particular, the PoP at the IP address) can serve content to the client computing device 102. In this manner, the DNS 120 is capable of making routing decisions and routing network traffic based on the encoded domain name provided by the client computing device 102.

Figure 3B:
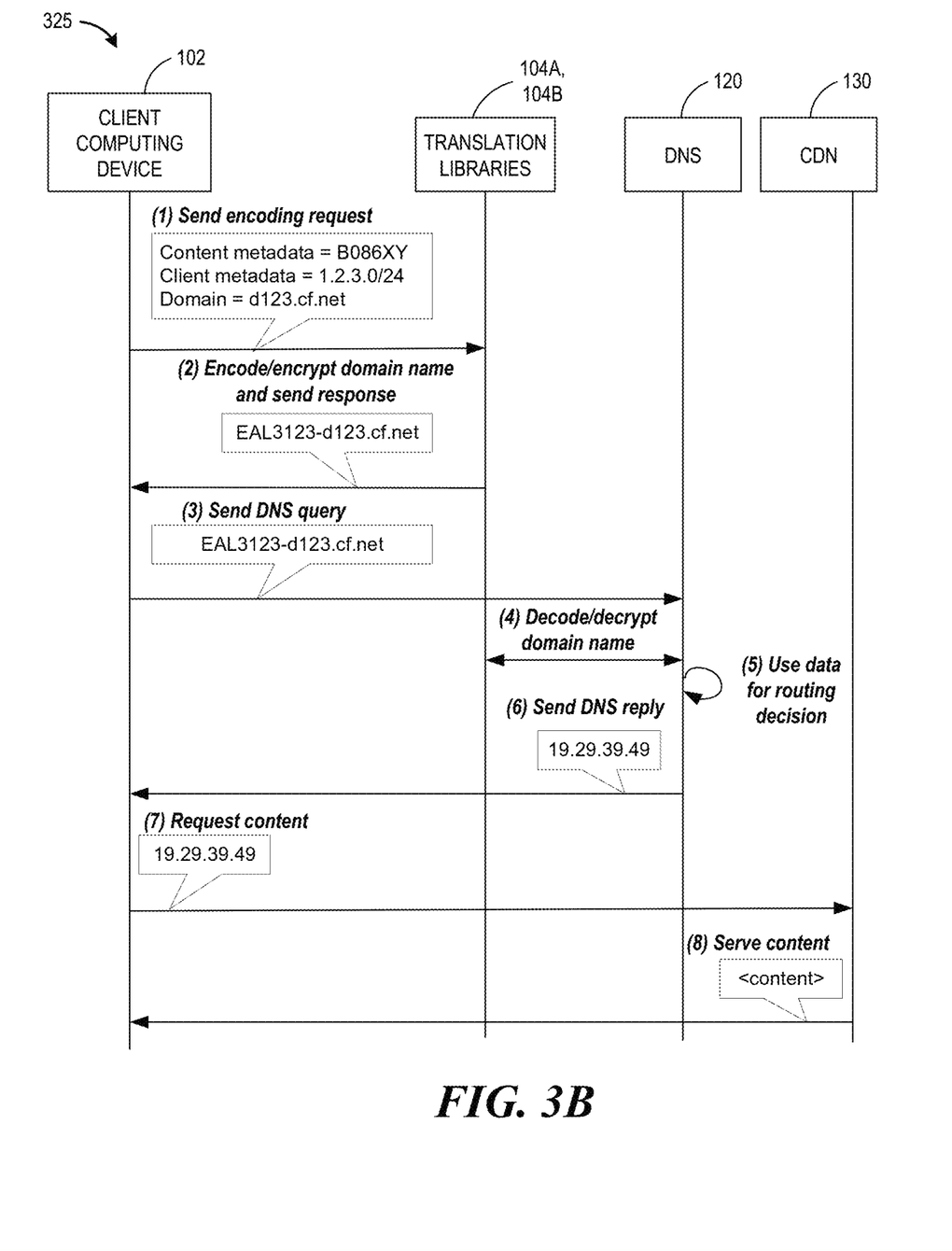

Turning to FIG. 3B, additional illustrative interactions related to encoding a domain name and using the encoded domain name to make a routing decision are depicted. The components of the environment 325 of FIG. 3B can be similar to the components of the environment 300 of FIG. 3A. Moreover, the steps one through eight (1-8) of FIG. 3B can be similar to steps one through eight (1-8) of FIG. 3A. However, unlike the interactions shown in FIG. 3A, in the interactions of FIG. 3B the example domain name in step one (1) may not be an alias. For example, the domain name (here "d123.cf.net") may refer to a particular distribution in the CDN 130 (here the "d123" distribution). Accordingly, at step two (2) of FIG. 3B, the encoded domain name may include a portion of the original domain name label in the encoded domain label separated by a delimiter (here a hyphen character "-"). For example, as shown, the encoded portion "EAL3123" text is appended to the existing distribution "d123" text to result in an encoded domain "EAL3123-d123.cf.net". The remaining steps in FIG. 3B may behave similarly to the steps of FIG. 3A.

Figure 3C:
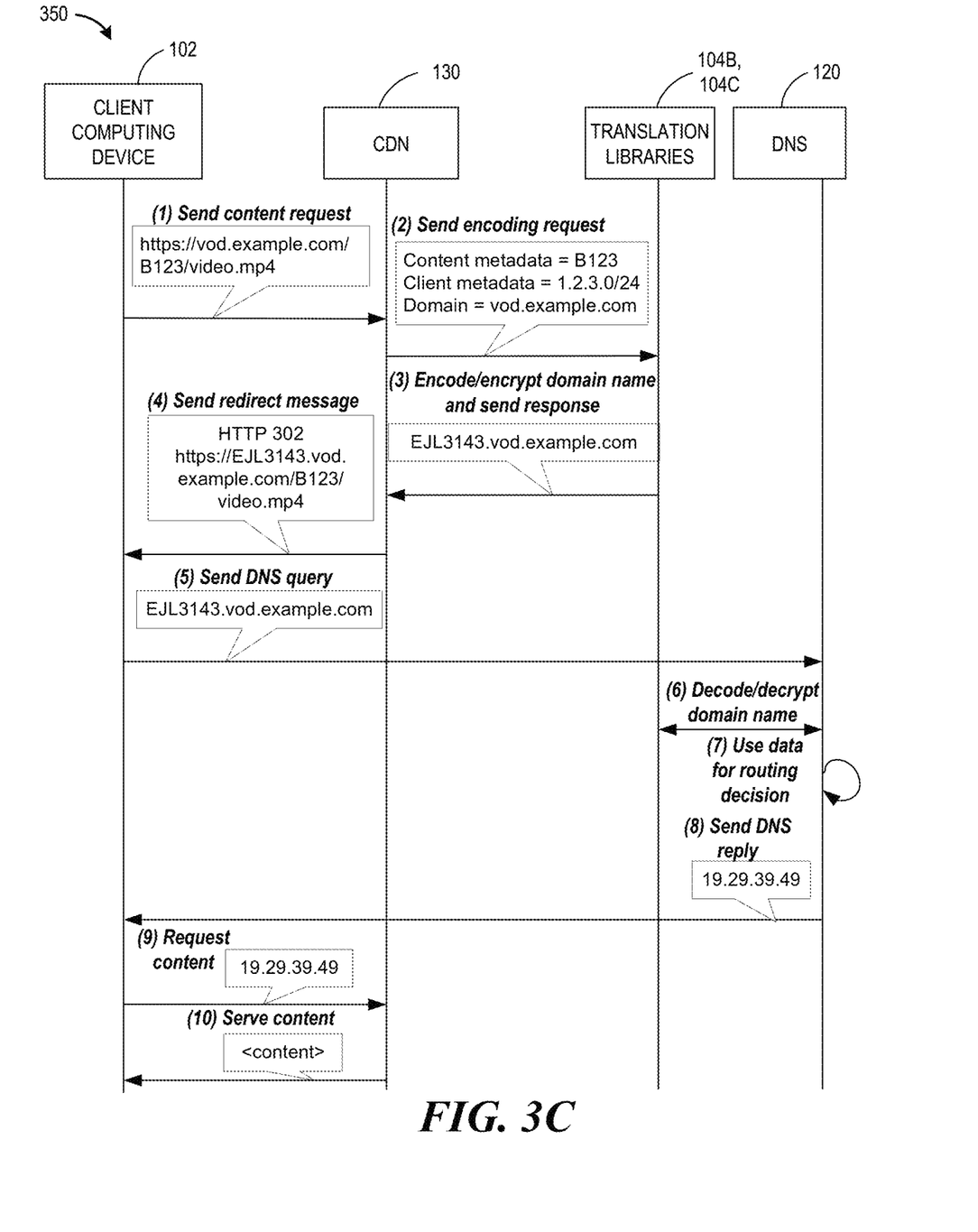
FIG. 3C is a flow diagram depicting illustrative interactions related to encoding a domain name, sending a redirection message including the encoded domain name, and using the encoded domain name to make a routing decision.

With reference to FIG. 3C, illustrative interactions related to encoding a domain name, sending a redirection message including the encoded domain name, and using the encoded domain name to make a routing decision are depicted. The components of the environment 350 of FIG. 3C can be similar to the components of the environment 150 of FIG. 1B. The components of the environment 350 of FIG. 3C can also be similar to the components of the environment 300 of FIG. 3A. The depicted interactions in FIG. 3C are example interactions, some or all of which may be optional depending on the circumstances or embodiment. Other interactions (not illustrated) may be possible in accordance with the present disclosure in other embodiments; not every possible communication may be depicted in FIG. 3C.

The interactions of FIG. 3C begin at step one (1) where the client computing device 102 can send a content request. As described herein, in some embodiments, the client computing device 102 may not have translation capabilities to encode a domain name. Instead the client computing device 102 makes a traditional content request. As illustrated, the example content requested is the resource at "https://vod.example.com/B123/video.mp4". The client computing device 102 can send a content request (such as an HTTP GET request) to the IP address that has been resolved to the domain name "vod.example.com".

At step two (2), the CDN 130 can send an encoding request to the translation library 104C. In response to receiving the content request, the CDN 130 may use the translation library 104C to encode and encrypt a domain name. The CDN 130, via the content request, may receive client metadata and content metadata, which may be similar to the client metadata and the content metadata described herein and with described with respect to FIG. 3A discussed above.

At step three (3), the translation library 104C can encrypt and encode the content metadata and client metadata in a domain name label. The encrypting and encoding performed by the translation library 104C of FIG. 3C can be similar to the encrypting and encoding performed by the translation library 104A of FIG. 3A. As result, the translation library 104C can append the encoded domain name label to the domain name (here the example encoded domain name label is "EJL3143" is appended to the domain name "vod.example.com"). The translation library 104C can send a response with the encoded domain to the client computing device 102. An application executing on the CDN 130 can receive the encoded domain from the translation library 104C.

At step four (4), the CDN 130 can respond to a request for content with a message redirecting the client computing device 102 to the encoded domain name. As illustrated, the redirect message can be a HTTP 302 redirect message that redirects the client computing device 102 to the encoded domain name (here "https://EJL3143.vod.example.com/B123/video.mp4"). Additionally or alternatively, the CDN 130 can use different redirect messages. For example, in some embodiments, the CDN 130 provides JavaScript in HTML content provided in the HTTP response that causes the client computing device 102 to redirect to the encoded domain.

The remaining steps, steps five through eight (5-10) of FIG. 3C can be similar to steps three through eight (1-8) of FIG. 3A, respectively. As a result, at step five (5), the client computing device 102 sends a DNS query for the encoded domain name, and the DNS 120, using the translation library 104B, can decrypt and decode at least a portion of the domain name label (step six). The DNS 120 can use the data decoded from the domain name label to make a routing decision and select a particular point of presence (step seven). As discussed above, the DNS 120 can send, to the client computing device 102, a DNS reply with the Internet Protocol (IP) address of the selected point of presence (step eight) and the client computing device 102 can then request content from the point of presence identified by the provided IP address (step nine) and receive the content (step ten).

Moreover, while the example of FIG. 3C does not illustrate a hostname without an alias, such as hostname may be handled by the translation library 104C to include a prefix, such as a distribution name.

Figure 4:
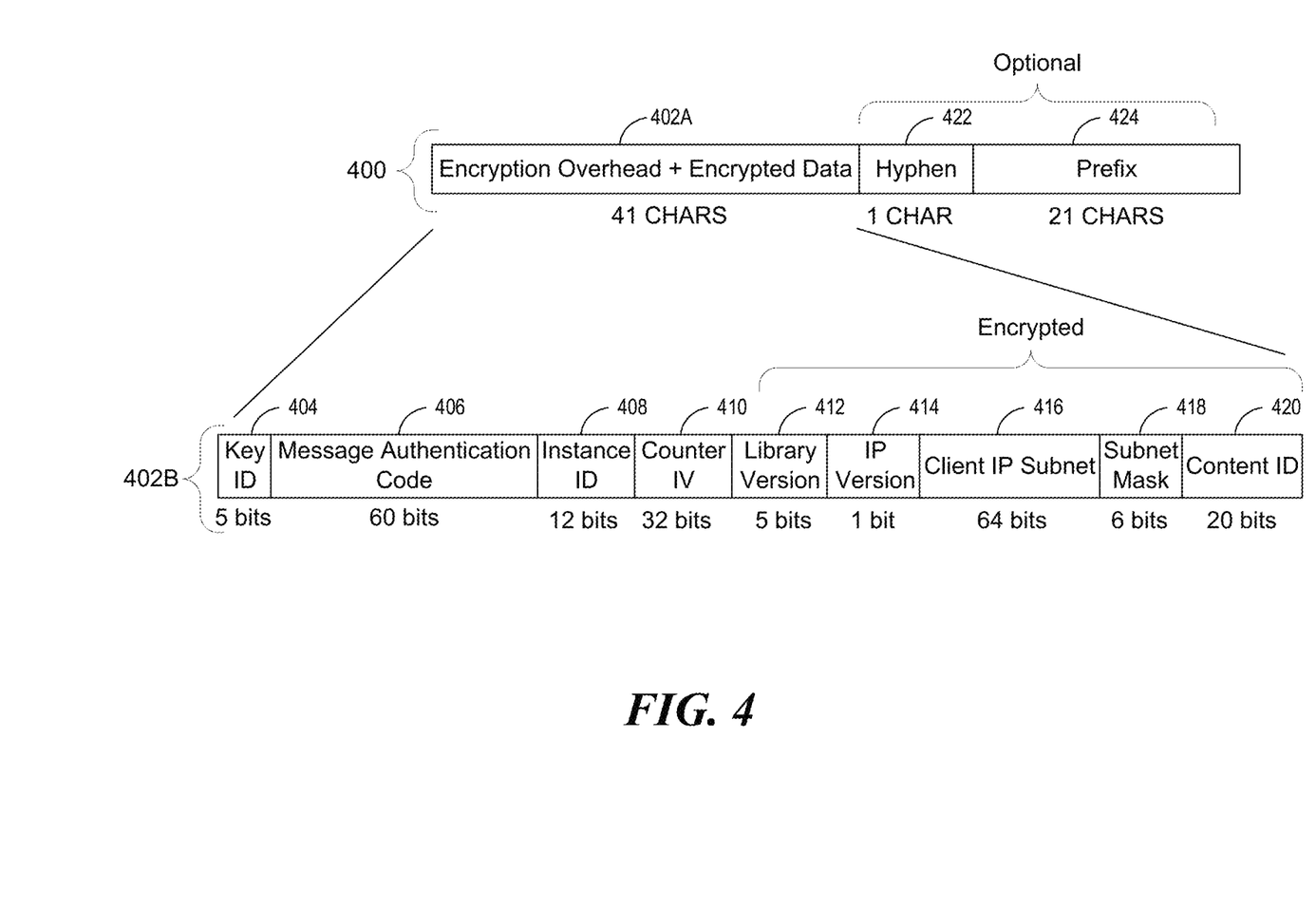
FIG. 4 is a schematic diagram depicting an illustrative encoding and encryption format for a domain name label.

FIG. 4 is a schematic diagram depicting an illustrative encoding and encryption format for a domain name label. The example representation block 400 depicts a domain name label. As described herein, a domain name label can be up to 63 characters, where each character is one (1) byte. The first portion 402A of the domain name label can include the encryption overhead and the encrypted data. In some embodiments, since some CDN implementations may not use aliases, a second portion 422, 424 of the domain name label can be reserved for a delimiter (here the hyphen character "-") and a prefix 424, such as a distribution DNS name. As shown, one example allocation of the 63 characters for the example format is to use 41 characters for the encryption overhead and the encrypted data and the remaining 22 characters (one character being for a delimiter) can be allocated to the delimiter 422 and the prefix 424. As shown, the 41 characters for the portion 402A, with a base32 encoding, can result in 205 bits available for encryption overhead and the encrypted data portion 402A.

Different allocations of the 63 bytes can be used depending on the embodiment. For example, some embodiments may not allocate a portion of the domain name label for a prefix and/or may allow a client to omit a prefix portion of the domain name label. Therefore, while not illustrated in FIG. 4, the encryption overhead and encrypted data portion 402A can take up to 63 bytes of the domain name label in some embodiments.

The example representation block 402B depicts the first portion 402A of the domain name label in further detail. As shown, a portion of the representation block 402B may not be encrypted, such as the fields used for the encryption overhead. The representation block 402B includes a key identifier 404. The key identifier 404 can indicate to the receiving party, which particular secret key was used by the translation libraries 104A, 104B, 104C. The representation block 402B includes an instance identifier 408. As described herein, each translation library 104A, 104B, 104C can have a distinct instance identifier 408 that can be associated with a particular range of counter initialization vectors that can be used for encryption purposes.

Thus, the representation block 402B can further include the counter initialization vector 410. In some embodiments, the counter initialization vector 410 can be used for encrypting client and/or content metadata using an algorithm, such as, but not limited to, encryption Advanced Encryption Standard (AES) Counter Mode algorithm for encrypting data. The example representation block 402B can further include a message authentication code 406. An example message authentication code 406 can be generated with a hash-based message authentication code (HMAC) algorithm, such as HMAC-SHA256. In some embodiments, the HMAC can be computed on the counter initialization vector 410 and the cyphertext generated for the encrypted portion 412, 414, 416, 418, 420. The message authentication code 406 can be used to verify the integrity and authenticity of a message and verify that those portions of the domain name have not been tampered. Tampering is a concern because DNS queries and other messages with encoded domain names can be transmitted over networks with many intermediary nodes where attempted tampering could occur.

The encrypted portion 412, 414, 416, 418, 420 of the representation block 402B can include client metadata and content metadata. As illustrated, example client metadata can be or include an indication of the IP version 414 (such as IPv4 or IPv6), the client IP subnet 416, and/or the subnet mask 418. The version of the translation library can be further indicated by the by the library version 412, which can be use by the receiving translation library to properly decrypt and decode the encoded domain. As illustrated, example content metadata can be or include the content identifier 420, which can identify specific content or a group of content.

The fields 404, 406, 408, 410, 412, 414, 416, 418, 420 in the domain name label 400 can be example fields. Alternative fields or fields of different lengths can be used in the domain name label 400. For example, while not illustrated in FIG. 4, a client device type identifier can be included in the client metadata portion of the domain name label.

Figure 5:
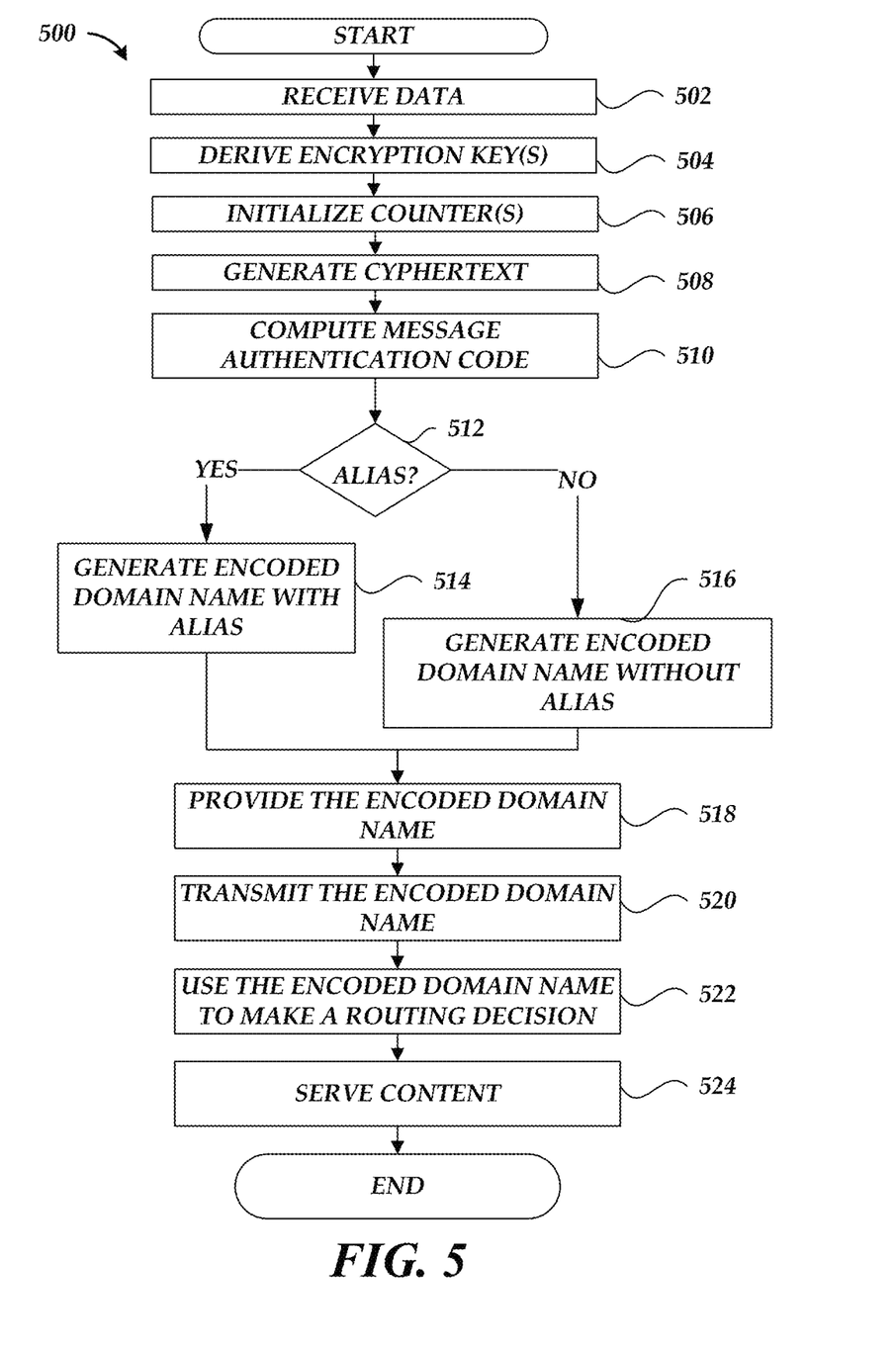
FIG. 5 is a flow chart depicting an example method for encoding a domain name and using the encoded domain name to make a routing decision.

FIG. 5 is a flow diagram depicting an example method 400 implemented by various devices, such as the client computing device 102, the DNS server 124, and/or the point of presence (PoP) 132 for encoding domain names and using the encoded domain names. In some embodiments, the client computing device 102, the DNS server 124, and/or the point of presence (PoP) 132 may include the translation library 104A, 104B, 104C, each of which may implement aspects of the method 500.

Beginning at block 502, data can be received. For example, the translation library 104B can receive client metadata, content metadata, and a domain name. In some embodiments, a request to encode a domain name can be received. For example, the translation library 104B of the client computing device 102 can receive an encoding request. The request can include at least client metadata, content metadata, and a domain name. An application executing on the client computing device 102 can communicate with the translation library 104 to request an encoded domain name, such as a video streaming application or a repository application to name a few examples. As described herein, example client metadata can include, but is not limited to, at least one of an Internet Protocol (IP) address for a client computing device 102, an IP subnet for the client computing device 102, or a device type for the client computing device 102. As described herein, example content metadata can include, but is not limited to, an identifier for a content group or an identifier for media content.

As described herein, in some embodiment the client computing device 102 does not have translation capabilities and the point of presence (PoP) can communicate with the translation library 104C. In such a case, the translation library 104C of the PoP may receive the client metadata, content metadata, and a domain name.

At block 504, encryption keys can be derived. For example, the translation library 104A, 104C can derive multiple keys from an original key. The translation library 104A, 104C can derive, from the original key and salt, at least two keys. At least one of the keys, an encryption key, can be used for encryption. At least one other key, the cryptographic key, can be used for the message authentication code. An example algorithm for deriving multiple encryption keys can include the HMAC key derivation function. The example HKDF algorithm extracts a pseudo-random key using an HMAC hash function (e.g., HMAC-SHA256) on an optional salt (acting as a key) and the input key, the original key, acting as data.

At block 506, a counter can be initialized for encryption. Example counters can include, but are not limited to, arbitrary numbers and can be referred to as counter initialization vectors. For example, each instance of the translation library 104A, 104C can be associated with a range of counter initialization vectors. The translation library 104A, 104C can select a new counter initialization vector from within the range available for the instance, which can be calculated by incrementing a previous counter initialization vector. The encryption key management system 110 can assign the ranges to particular instances of the translation library 104A, 104C to ensure that each counter initialization vector used for encryption is unique. If an instance begins to run out of counter initialization vectors, the encryption key management system 110 can assign a new key to the instance.

At block 508, cyphertext can be generated. For example, the translation library 104A, 104C can generate the cyphertext using an encryption algorithm, such as an AES counter mode encryption. In some embodiments, the translation library 104A, 104C generates some random bits with the encryption key and the counter initialization vector; the translation library 104A, 104C XORs the random bits with the input text to generate the cyphertext, which is randomized text. In the counter mode, the counter initialization vector can be incremented with each use. As described herein, the translation library 104A, 104C can encrypt the client metadata and the content metadata received as input. Additional details regarding example fields that can be encrypted are described in further detail herein, such as with respect to FIG. 4 discussed above.

At block 510, a message authentication code can be computed. For example, the translation library 104A, 104C can compute the message authentication code from at least the cyphertext. The translation library 104A, 104C can generate an example message authentication code with a hash-based message authentication code (HMAC) algorithm, such as HMAC-SHA256. The translation library 104A, 104C can compute the message authentication code at least by applying a cryptographic hash function to the cyphertext and the cryptographic key. In some embodiments, the translation library 104A, 104C generates the cyphertext further by at least encrypting the client metadata and the content metadata using the encryption key and the counter initialization vector. As described herein, the message authentication code can be used to verify that at a least a portion of the encoded domain name has not been tampered.

At block 512, it can be determined whether the initially provided domain name is an alias or not. If there is not an alias, the method 500 proceeds to block 516 to generate the encoded domain name without an alias. If there is an alias, the method 500 proceeds to block 514 to generate the encoded domain name with an alias. At block 516, if there is not an alias for the domain name, the translation library 104A, 104C can generate the encoded domain name by combining at least the message authentication code, the cyphertext, and the prefix portion of the original domain name as delimited, and along with the rest of the original domain name. At block 514, if there is an alias, the translation library 104A, 104C can generate the encoded domain name by combining at least the message authentication code, the cyphertext, and the domain name. In some embodiments, the instance of the translation library 104A, 104C has an identifier and the generating the encoded domain can include combining the instance identifier with the message authentication code, the cyphertext, and the domain name. As described herein, the translation library 104A, 104C can make sure that the encoded data fits within the 63 bytes limit of a domain name label. Additional details regarding combining the domain name to result an encoded domain name are described herein, such as with respect to FIGS. 3A, 3B, 3C, 4.

At block 518, the encoded domain name can be provided. For example, the translation library 104A, 104C can provide the encoded domain name to the application requesting it. Continuing with one example, the client computing device 102 and an application executing on the device 102 can receive the encoded domain name from the translation library 104A to look up a resource. In another example, an application executing on the point of presence (PoP) 132 can receive the encoded domain name from the translation library 104C.

At block 520, the encoded domain name can be transmitted. For example, the client computing device 102 can transmit, to a DNS resolver, a DNS query that includes at least the encoded domain name. In other embodiments, the point of presence (PoP) 132 can generate a redirection message that includes at least the encoded domain name. The PoP 132 can further transmit, to the client computing device 102, a redirection message configured to cause the client computing device to request an IP address for the encoded domain name. An example redirection message can be an HTTP response that includes at least a 302 status code. In another example, the redirection message can include a JavaScript instruction configured to cause the client computing device 102 to request the IP address for the encoded domain name. For example, either example JavaScript instruction, "window.location.href='https://EJL3143.vod.example.com/B 123/video.mp4'" or "window.location.replace='https://EJL3143.vod.example.com/B123/video.mp4'", can cause the client computing device 102 to request the IP address for the encoded domain name, such as by issuing a DNS query for the domain name.

At block 522, the encoded domain name can be used to make a routing decision. For example, the DNS server 124 can receive the encoded domain name and can further decrypt and decode the encoded domain name using the translation library 104B. The translation library 104B, using the information from the domain name label, can verify the integrity of the contents of the domain name label and decrypt and decode the domain name label. For example, the translation library 104B at the DNS 120 can have the same secret key and using the counter initialization vector can decrypt and then decode the client metadata and the content metadata.

The DNS server 124 can use the client metadata and the content metadata to make a routing decision. For example, as described herein, the DNS server 124 can select a point of presence (PoP) with an appropriate cache size or can direct to a PoP that has the resource cached already or is likely to have the resource cached already. Continuing with the cache size example, if the requested content (determined from the content metadata) is a thirty-minute show versus a three-hour movie, the size of the resource can be efficiently assigned to a PoP with a resource cache of appropriate size. As another example, using the client metadata, such as the client computing device's subnet, the DNS server 124 can advantageously select a PoP that would efficiently provide network content based on the geolocation of the client computing device. The DNS server 124 can determine, from among a plurality of points of presence a particular point of presence based on one of the client metadata and the content metadata, as described herein. The DNS server 124 can determine the Internet Protocol (IP) address of the selected PoP and can provide the IP address to the client computing device 102 in a DNS reply.

The DNS server 124 can use the client metadata to affect routing of future requests. For example, the DNS server 124 receives DNS queries via the DNS resolver 121. As described herein, those DNS queries can include domain names with encoded client metadata. The DNS server 124 can generate mappings between a particular DNS resolver(s) 121 and one or more specific client networks (such as client networks identified by IP subnet). Thus, if the DNS server 124 receives a DNS query from a previously mapped DNS resolver 121 but the DNS query does not have an encoded domain, then the DNS server 124 can optionally re-select the point of presence (PoP) that was previously selected based on a client-based decision for that particular DNS resolver.

The client computing device 102 can receive, from the DNS resolver 121, the DNS reply. As described herein, the DNS reply can include at least the Internet Protocol address for the encoded domain. Accordingly, the client computing device 102 can transmit a content request with the Internet Protocol address as the destination address. An example content request can be an HTTP GET request with the provided Internet Protocol address as the destination address. At block 524, the content can be served. For example, the point of presence (PoP) 132 can serve the requested content to the client computing device 102.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The term "substantially" when used in conjunction with the term "real-time" forms a phrase that will be readily understood by a person of ordinary skill in the art. For example, it is readily understood that such language will include speeds in which no or little delay occurs.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for encoding domain names for use by a Domain Name System (DNS) for network traffic routing, the system comprising:
   a data storage medium; and
   a computer hardware processor in communication with the data storage medium, wherein the computer hardware processor is configured to execute computer-executable instructions to at least:
      receive a request to encode a domain name, the request including at least client metadata, content metadata, and a first domain name;
      generate cyphertext from at least the client metadata and the content metadata, wherein generating the cyphertext includes at least encrypting the client metadata and the content metadata;
      compute a message authentication code from at least the cyphertext, wherein computing the message authentication code includes at least applying a cryptographic hash function to the cyphertext and a cryptographic key;
      generate an encoded domain name, wherein generating the encoded domain name further includes at least:
         combining the message authentication code, the cyphertext, and the first domain name; and
      provide the encoded domain name.

2. The system of claim 1, wherein the computer hardware processor is configured to execute further computer-executable instructions to at least:
   transmit, to a DNS resolver, a DNS query that includes at least the encoded domain name.

3. The system of claim 2, wherein the computer hardware processor is configured to execute additional computer-executable instructions to at least:
   receive, from the DNS resolver, a DNS reply, wherein the DNS reply includes at least an Internet Protocol address for the encoded domain name; and
   transmit a content request with the Internet Protocol address as a destination address.

4. The system of claim 1, wherein the computer hardware processor is configured to execute further computer-executable instructions to at least:
   generate a redirection message including at least the encoded domain name; and
   transmit, to a client computing device, a redirection message configured to cause the client computing device to request an IP address for the encoded domain name.

5. The system of claim 4, wherein the redirection message is an HTTP response that includes at least a 302 status code.

6. The system of claim 4, wherein the redirection message includes a JavaScript instruction configured to cause the client computing device to request the IP address for the encoded domain name.

7. A computer-implemented method comprising:
   under control of a computer hardware processor configured with specific computer executable instructions,
      receiving client metadata, content metadata, and a first domain name;
      generating cyphertext from at least the client metadata and the content metadata, wherein generating the cyphertext includes at least encrypting the client metadata and the content metadata;
      computing a message authentication code from at least the cyphertext, wherein computing the message authentication code includes at least applying a cryptographic hash function to the cyphertext and a cryptographic key;

generating an encoded domain name, wherein generating the encoded domain name further includes at least: combining the message authentication code, the cyphertext, and the first domain name; and providing the encoded domain name.

8. The computer-implemented method of claim 7, further comprising:

deriving, from an original key and salt, an encryption key and the cryptographic key, wherein generating the cyphertext further includes at least encrypting the client metadata and the content metadata using the encryption key and a counter initialization vector.

9. The computer-implemented method of claim 8, wherein generating the encoded domain name further includes at least:

combining the counter initialization vector with the message authentication code, the cyphertext, and the first domain name.

10. The computer-implemented method of claim 8, further comprising:

receiving, from an encryption key management server, a new key assigned to a particular instance of an encryption library.

11. The computer-implemented method of claim 10, wherein the particular instance of the encryption library is associated with an instance identifier, and wherein generating the encoded domain name further includes at least:

combining the instance identifier with the message authentication code, the cyphertext, and the first domain name.

12. The computer-implemented method of claim 7, wherein the message authentication code and the cyphertext are included in a portion of the encoded domain name, and wherein the portion of the encoded domain name is up to 63 bytes.

13. The computer-implemented method of claim 7, further comprising:

generating a redirection message including at least the encoded domain name; and transmitting, to a client computing device, a redirection message configured to cause the client computing device to request an IP address for the encoded domain name.

14. A system comprising:

a data storage medium; and a first computer hardware processor in communication with the data storage medium, wherein the first computer hardware processor is configured to execute computer-executable instructions to at least:

receive client metadata, content metadata, and a first domain name;

generate cyphertext from at least the client metadata and the content metadata, wherein generating the cyphertext includes at least encrypting the client metadata and the content metadata;

compute a message authentication code from at least the cyphertext, wherein computing the message authentication code includes at least applying a cryptographic hash function to the cyphertext and a cryptographic key;

generate an encoded domain name, wherein generating the encoded domain name further includes at least: combining the message authentication code, the cyphertext, and the first domain name; and provide the encoded domain name.

15. The system of claim 14, further comprising a second computer hardware processor, wherein the first computer hardware processor is configured to execute further computer-executable instructions to at least:

transmit, to a DNS resolver, a DNS query that includes at least the encoded domain name, wherein the second computer hardware processor is configured to at least:

receive the DNS query including the encoded domain name;

decrypt and decode, from the encoded domain name, the client metadata and the content metadata;

determine, from among a plurality of points of presence a particular point of presence based on one of the client metadata and the content metadata;

identify an Internet Protocol address associated with the particular point of presence; and transmit a DNS reply that includes at least the Internet Protocol address.

16. The system of claim 14, wherein the content metadata includes at least an identifier for a content group.

17. The system of claim 14, wherein the content metadata includes at least an identifier for media content.

18. The system of claim 14, wherein the client metadata includes at least one of an Internet Protocol (IP) address for a client computing device, an IP subnet for the client computing device, or a device type for the client computing device.

19. The system of claim 14, wherein the first hardware processor is configured to execute further computer-executable instructions to at least:

derive, from an original key and salt, an encryption key and the cryptographic key, wherein generating the cyphertext further includes at least encrypting the client metadata and the content metadata using the encryption key and a counter initialization vector.

20. The system of claim 19, wherein the first hardware processor is configured to execute additional computer-executable instructions to at least:

receive, from an encryption key management server, a new key assigned to a particular instance of an encryption library.

* * * * *